United States Patent [19]
Gale et al.

[11] 4,048,464
[45] Sept. 13, 1977

[54] METHOD OF AND MEANS FOR CUTTING HOSE FOR HIGH PRESSURE HYDRAULIC SYSTEMS

[75] Inventors: Preston Lee Gale, East Peoria; Warren Jess Stafford, Peoria, both of Ill.

[73] Assignee: Fuji Photo Film Co., Ltd., Minami-ashigara, Japan

[21] Appl. No.: 607,076

[22] Filed: Aug. 22, 1975

[51] Int. Cl.$^2$ .......................................... B23K 26/00
[52] U.S. Cl. ............................................ 219/121 LM
[58] Field of Search ..................... 219/121 L, 121 LM

[56] References Cited
U.S. PATENT DOCUMENTS

| | | | |
|---|---|---|---|
| 3,619,550 | 11/1971 | Matthews | 219/121 L |
| 3,839,005 | 10/1974 | Meyer | 219/121 L |
| 3,870,852 | 3/1975 | Kogert | 219/121 LM |
| 3,953,706 | 4/1976 | Harris et al. | 219/121 L |

OTHER PUBLICATIONS

J. E. Harry et al., "Electrothermal Cutting Processes using a $CO_2$ Laser", *IEEE Trans. on Industry Applications*, vol. 14–18, No. 4, July 8, 1972, pp. 418–424.

*Primary Examiner*—J. V. Truhe
*Assistant Examiner*—Clifford C. Shaw
*Attorney, Agent, or Firm*—Sughrue, Rothwell, Mion, Zinn and Macpeak

[57] ABSTRACT

A method of and means for cutting hose of the type designed for use in high pressure hydraulic systems is disclosed in which the impingement of a high power laser beam is moved about the periphery of the hose in a plurality of passes. An embodiment is described in which the hose remains stationary with the beam being moved thereabout and a further embodiment is disclosed in which the beam remains stationary and the hose is rotated about its own axis. The provision of inert gas to prevent combustion both inside and outside the hose during cutting thereof is disclosed.

5 Claims, 3 Drawing Figures

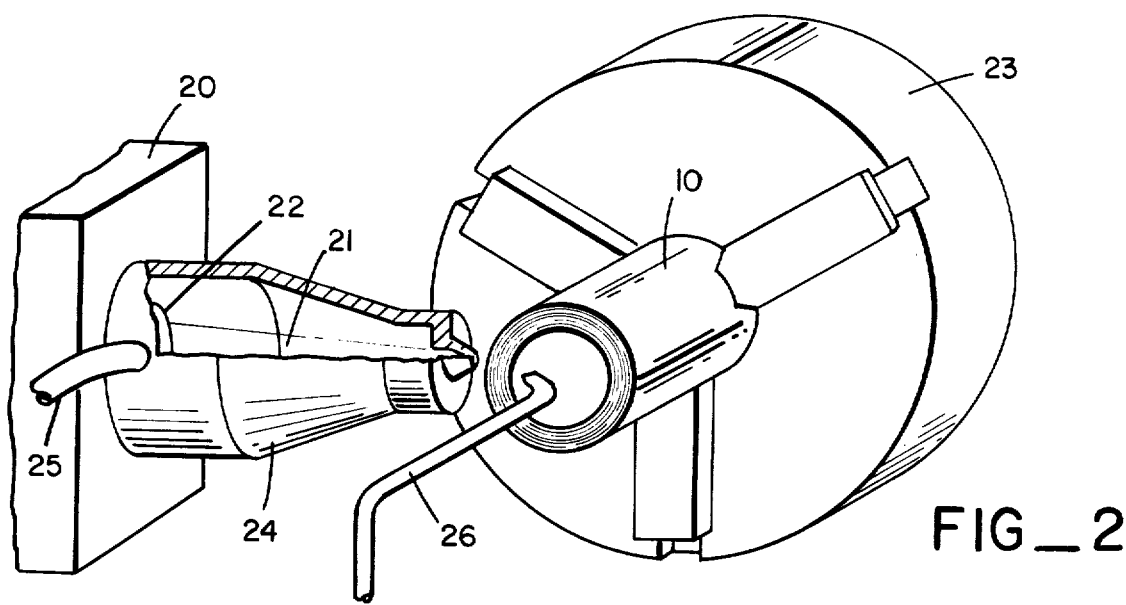
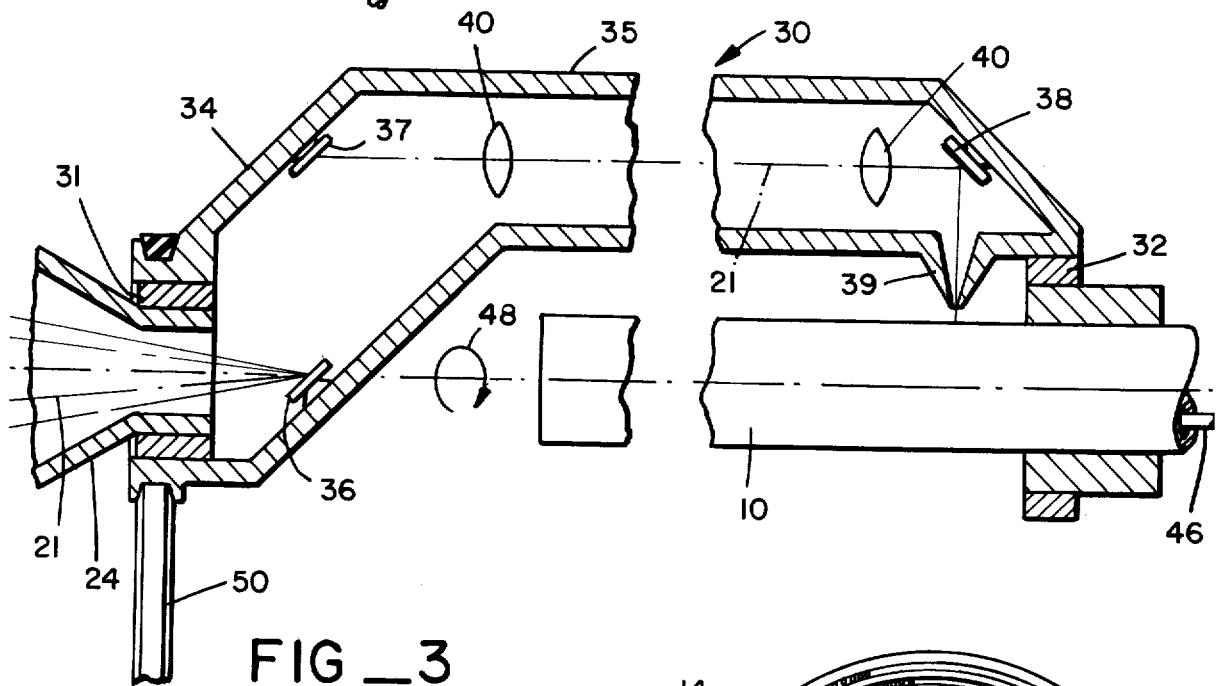
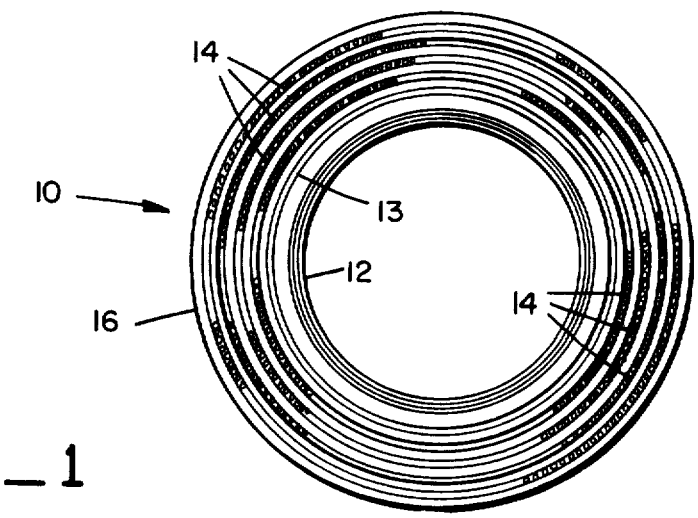

METHOD OF AND MEANS FOR CUTTING HOSE FOR HIGH PRESSURE HYDRAULIC SYSTEMS

BACKGROUND OF THE INVENTION

This invention relates to methods of and means for cutting hose for high pressure hydraulic systems into lengths appropriate for use and more particularly to methods of and means for using a laser beam to cut high pressure hydraulic hose to length.

Hose for conducting the fluids of high pressure hydraulic systems must be designed to be flexible and wear resistant in addition to being fluid impervious and capable of withstanding the very high pressure of the fluids they conduct. Thus, a cross-section of such hose presents a complex arrangement of materials including rubber, reinforcing metal members and fabrics of natural or synthetic materials.

Such hose is most efficiently fabricated by substantially continuous processes resulting in very long lengths of hose which must be cut into sections of appropriate shorter length for subsequent use. In the prior art, various mechanical cutting techniques have been used to cut the hose to proper length. For example, a metal bandsaw has been widely used for this purpose. However, the dissimilarity of the materials of which the hose is made and the necessary strength of the metal reinforcing has made it necessary to use high quality bandsaw blades and to replace them often thus making the process of cutting the hose according to the prior art both expensive, in terms of operational cost, and time consuming. In addition, the quality of the cut provided by prior art processes tended to be reduced by the tendency of certain of the materials to tear or be weakened by the cutting process.

According to this invention, a high power laser beam is used to cut the hose resulting in a saving in both operational cost and time. In addition, it has been found that the cutting process of this invention results in a cut of improved quality in that there is no tearing or weakening at the cut of the various materials of which the hose is made or of their structural interrelationship with each other.

Cutting of composite materials such as rubberized wire has been proposed heretofore. For example, U.S. Pat. No. 3,870,852 to Kogert discloses a process and apparatus for cutting a rubberized stranded wire web with a $CO_2$ laser beam. However, according to the teaching of Kogert, it was necessary to clamp the web of rubberized wire between heat sink means adjacent the cut in order to prevent destruction of the rubber coating adjacent the cut. Such teaching is obviously inapplicable to the cutting of high pressure hydraulic hose due not only to the mechanical difficulty of providing the necessary heat sink at the interior surface of the hose but also to the wall thickness of such hose which renders it impossible to provide the requisite cooling throughout the depth of the cut.

It is the primary object of this invention to provide a method of and means for cutting hose for high pressure hydraulic systems through the use of a laser beam.

SUMMARY OF THE INVENTION

Briefly, according to this invention, hose for use in high pressure hydraulic systems is cut by positioning a free end of the hose so that a given length may be cut therefrom. A high power laser beam is impinged upon a limited area of the exterior of the hose at such given length from the free end for a sufficient time to vaporize a portion of the material of the hose at such limited area without deleterious heating of immediately adjacent areas thereof. The limited area of impingement of the beam is flooded with an inert gas to prevent combustion of the vaporized material and the impingement of the beam and flooding of the inert gas is moved about the periphery of the hose to successively impinge and flood contiguous limited areas in a peripheral line corresponding to the desired cut in a plurality of repeated passes to separate the given length from the remainder of the hose by vaporization of material from the hose at the peripheral line corresponding to the desired cut.

BRIEF DESCRIPTION OF THE DRAWING

The foregoing and other objects and features of this invention will be more fully understood from a reading of the following detailed description of preferred embodiments in conjunction with the drawing wherein:

FIG. 1 is a cross-sectional view in elevation of a hose for use in a high pressure hydraulic system to be cut in accordance with the teaching of this invention;

FIG. 2 is a fragmentary perspective view partly in section of a means for practicing the method in accordance with one embodiment of this invention;

FIG. 3 is a fragmentary cross-sectional view of a means for practicing the method in accordance with another embodiment of this invention.

DETAILED DESCRIPTION OF PREFERRED EMBODIMENTS

Referring to the drawing, FIG. 1 is a cross-sectional view of the type of hose 10 used in high pressure hydraulic systems. Such hose 10 comprises an inner tubular core 12 which may be of comparatively low mechanical strength but is highly impervious to the hydraulic fluid used in the system at system pressures. The inner tubular core 12 is contiguously surrounded by a tubular layer 13 of heavy rubber which may include reinforcing materials such as a web or fabric of natural or synthetic fibers embedded therein.

The inner core 12 and tubular reinforcing layer 13 are surrounded by a plurality of concentric contiguous layers 14 each made up of a winding of elongated high tensile strength steel fibers impregnated with rubber. The outer surface of the hose comprises an overlapping winding of an elongated strip of fabric made of wear resistant natural or synthetic fibers.

In the process of manufacturing the hose 10, all of the various layers and materials thereof are intimately bonded through the use of heat and pressure into an integral whole capable of conducting the high pressure fluids throughout the system without danger of rupture or loss of fluid while at the same time remaining flexible in order to accommodate relative movement between various parts of the hydraulic system. In order to preserve the required continuity of the hose throughout any given length thereof, the process used to manufacture the hose is essentially continuous with the hose being subsequently cut to appropriate lengths for shipment or use.

In the prior art, the hose was cut to length through the use of mechanical cutting means such as a metal band saw for example. However, the great dissimilarity in the mechanical properties of the materials of which the hose is composed makes such cutting difficult and expensive. An extremely sharp saw blade is required together with low cutting speeds in order to avoid tearing or otherwise weakening the rubber components of the hose during the cutting of the steel wires or fibers. The slow cutting speed coupled with the necessity of making frequent changes in the saw blade makes the cutting operation according to the prior art expensive both in terms of time and in terms of material.

Cutting operations based on the use of heat could not be used to the difference in heat conducting properties between the steel wires and the rubber of which the hose is composed. It will be seen that if large amounts of heat are involved in the cutting of the hose, a substantial length of the steel wire on each side of the cut will be raised to a temperature high enough to have a deleterious effect on the bond between such wires and the rubber in which they are embedded. The weakening of the hose which would result from such overheating would increase the danger of rupture of the hose or leakage of hydraulic fluid therefrom in use.

Laser beams have been used in the prior art to cut relatively thin sheets of composite material such as rubberized metallic webs, for example. However, according to the teachings of the prior art, it was necessary to provide heat sinks and other means for cooling the composite material adjacent the cut and on each side thereof in order to avoid deleterious effects due to the heat produced by the laser beam during the cutting operation. Such cutting operations were performed in a single pass and relatively low laser beam power (i.e., 250 watts) was used to reduce any unnecessary heating of the thin material being cut.

However, prior art laser beam cutting techniques were not applicable in cutting hose for high pressure hydraulic systems due to the wall thickness of the hose and its tubular conformation resulting in a concentration of the heat involved in the cutting process at the cut end of the hose rather than the distribution of such heat over an extended length as in the prior art. The cooling techniques of the prior art involving the application of heat sinks or other cooling means to opposite surfaces of the material on each side of the cut is ineffective in the case of hose for high pressure hydraulic systems due to the wall thickness of such hose and the physical difficulty of properly locating such cooling means.

This invention is based on the discovery that by using a much higher power laser beam and performing the cut in a plurality of passes, each of which accomplishes only a portion of the desired cut, the deleterious effects of heating of the hose during the cutting operation is avoided. Apparently, the cooling provided by the more violent and immediate vaporization which occurs at higher power levels prevents the additive accumulation of heat at the cut which occur in an attempt to apply prior art cutting techniques in a single pass rather than a plurality of passes, particularly where the cut must have a substantial depth.

Referring to FIG. 2 of the drawing, a perspective view of a means actually used for practicing the method in accordance with the teaching of this invention is shown. A $CO_2$ laser capable of producing a 5–10 kilowatt beam of coherent electromagnetic energy at a wavelength of 10.6 micrometers is represented generally at 20. The beam represented at 21 is focused down to a spot size of about 0.030 inch (0.10 centimeter) diameter by a lens 22 at the output of the laser 20.

A section of the hose 10 for use in high pressure hydraulic systems is mounted in a chuck 23 for rotation about its own axis. The laser beam 21 is impinged on the outer peripheral surface of the section of hose 10 radially thereof at the point where the desired cut is to be made. Simultaneously the section of hose 10 is rotated about its own axis by the chuck 23 so that the residence time of the beam 21 on any particular point of the periphery of the section of hose 10 at the cut is only sufficient to vaporize a quantity of the material of the hose at a limited area of the cut without deleterious heating of the material in immediately adjacent areas.

As in the prior art, it is necessary to flood the limited area of the cut upon which the beam impinges with an inert gas to prevent combustion of the vaporized material which would add undesired heating to the cutting process. To this end the output lens 22 and laser beam 21 are surrounded by an appropriate nozzle 24 having an exit aperture therein for the beam 21 but being otherwise substantially gas-tight. An inert gas such as nitrogen is introduced into the nozzle 24 under pressure through an appropriate conduit 25. Thus, the nitrogen gas issues from the exit aperture with the beam 21 in an appropriate jet which will intermix with the vaporized material and carry it away to the low temperature surrounding atmosphere before allowing it to mix with sufficient oxygen to support combustion. As shown in FIG. 2, a second conduit 26 is provided for conducting an inert gas such as nitrogen to the interior of the section of hose 10 where the inert gas is discharged through an appropriate nozzle in a jet directed against the inner periphery of the section of hose 10 in direct opposition to the jet issuing from the nozzle 24. The jet of inert gas provided by the conduit 26 prevents combustion from occurring internally of the section of hose 10 during the last stages of the cut when the laser beam 21 penetrates to the interior thereof.

In an actual test of the method and means in accordance with the teaching of this invention, the hose 10 had an outer diameter of 2½ inches (6.3 centimeters) and a total wall thickness of ⅜ inch (1 centimeter). The hose was a six-ply hose which indicates that there were six layers 14 of the high tensile strength steel winding about the inner core 12 and tubular reinforcing 13 in addition to the outer wear resistant winding 16. The section of hose 10 was rotated about its own axis by the chuck 23 at 40 revolutions per minute.

It was found that such hose 10 could be cut to length in 5 to 7 seconds when the laser was operated at 10 kilowatts. In other words, a little over three passes of the beam about the outer periphery of the hose 10 was required in order to cut entirely through the wall thereof when a 10 kilowatt beam was used. When the laser 20 was operated at 5 kilowatts, 10 to 12 seconds or about seven passes of the beam about the periphery of the hose was required in order to accomplish the desired cutting.

Nitrogen gas at a pressure of 70–80 psi (about 500 kpa) was used both in the nozzle 24 and in the conduit 26. The resulting cut was clean and without deleterious effect on the bond joining the various components of the hose. The ends of the metal fibers were smoothly rounded and there was no tearing or weakening as by burning of the rubber components or outer wear resistant layer of the hose.

Referring to FIG. 3, a preferred embodiment of the means for practicing the method in accordance with the teaching of this invention is shown. According to this embodiment, an elongated section of the hose 10 is mounted through a stationary apertured chuck 33 for adjustment along its axis. Since the manufacturing process for the hose 10 is a substantially continuous process, very long sections of hose tend to be produced which would be difficult to rotate about their own axis in the process of cutting them to length. Thus, according to the embodiment of this invention shown in FIG. 3, the hose 10 is held stationary and means 30 are provided for rotating impingement of the beam about the outer periphery of the hose 10. It will be understood that the means 30 may take a wide variety of forms all of which would include appropriate mirrors and/or lenses for directing and maintaining the focusing of the laser beam as desired.

In the embodiment of FIG. 3, the beam 21 produced by the laser 20 (not shown in FIG. 3) is originally projected along the axis of the hose 10 as mounted in the chuck 33. Laser 20 is provided with a nozzle 24' similar to that shown in FIG. 2 but having an enlarged exit aperture for the beam 21. The nozzle 24' may be spaced a substantial distance from the chuck 33 in order to enable the cutting of sections of substantial length from the free end of the hose 10 and the means 30 for moving the impingement of the beam about the outer periphery of the hose 10 may bridge the space between the nozzle 24' and chuck 33 and be mounted thereon.

Thus, as shown in FIG. 3, the means 30 for moving the impingement of the beam about the outer periphery of the hose 10 comprises a hollow tubular eccentric or crank member with the nozzle 24' journaled in an open end thereof by means of bearings 31 and with the other end mounted for rotation about a cylindrical surface provided on the exterior of the chuck 33 by means of a ring bearing 32. The portion 34 of the tubular eccentric member adjacent the nozzle 24' extends at an angle to the coincident axes of the beam 21 and hose 10 from a collar which includes a bearing 31 and coaxially receives the end of the nozzle 24'. The remaining portion 35 of the tubular eccentric member extends from the end of the first portion 34 toward the chuck 33 with its axis parallel to the coincident axes of the beam 21 and hose 10.

The first portion 34 of the tubular eccentric member serves as the means for mounting a pair of mirrors 36 and 37 which serve to deflect the beam 21 normally to the axis of the hose 10 and redirect it along the axis of the portion 35 of the tubular eccentric member parallel to the axis of the hose 10. Thus, the first mirror 36 is located on the coincident axes of beam 21 and hose 10 and is inclined at an appropriate angle to reflect the beam 21 to the second mirror 37 which is located on the axis of the second portion 35 of the tubular eccentric member. A third mirror 38 is mounted on the axis of the second portion 35 of the tubular eccentric member at the end thereof adjacent the chuck 33 to receive the beam 21 from the mirror 37 and redirect it in a direction normal to the axis of the hose 10 for impingement on the outer peripheral surface of the hose 10. An appropriate restricted beam exit aperture 39 is provided on the second portion of the tubular eccentric member adjacent the chuck 33 and facing the hose 10.

The mirrors 36, 37 and 38 may be provided with appropriate surface conformation to focus and control the beam 21 in order to produce the desired beam spot size for impingement on the outer peripheral surface of the hose 10 to provide cutting thereof in accordance with the teaching of this invention. Alternatively, the mirrors 36, 37 and 38 may be simple flat mirrors and appropriate lens means 40 may be mounted within the tubular eccentric member for the purpose of controlling and focusing the beam 21.

An appropriate flexible hose or other means may be used to flood the area of impingement of the beam on the hose with an inert gas. For example, the nozzle 24' may be provided with a conduit (not shown) similar to the conduit 25 of FIG. 2 for the purpose of providing a flow of inert gas under pressure thereinto. Such inert gas will glow from the nozzle 24' through the tubular eccentric member and will exit from the beam exit aperture 39 with the beam in the form of a jet for the purpose of preventing combustion during the cutting process as described in connection with FIG. 2. Similarly, a conduit 46 may be provided which extends within the hose 10 from the end thereof opposite the free end from which a section is to be cut in order to provide a jet of inert gas within the hose as described in connection with the conduit 26 of FIG. 2.

An appropriate means is provided for rotating the tubular eccentric member of the means 30 about the coincident axes of the beam 21 and hose 10 as indicated by the arrow 48. For example, as shown in FIG. 3, a drive belt 50 may engage the outer surface of the collar of the first portion of the tubular eccentric member adjacent the nozzle 24'. Such drive belt 50 may be driven by an appropriate motor (not shown) in order to rotate the entire means 30 about the nozzle 24' and chuck 33 on the bearings 31 and 32 thereby moving the impingement of the laser beam 21 upon exit from the aperture 39 about the outer periphery of the hose 10. Rotational velocities of 40 revolutions per minute will not result in undue vibration of the means 30 since it may be made of light materials and rigidly supported on the bearings 31 and 32.

It is believed that those skilled in the art will make obvious changes in the means for practicing the method of cutting hose for high pressure hydraulic systems as disclosed hereinabove to suit their specific needs. Where the hose has a greater wall thickness than the hose of the specific test described hereinabove, it is expected that a greater number of passes about the outer periphery of the hose will be necessary in order to complete the cutting thereof. Similarly, if the hose has a smaller wall thickness, than a lesser number of passes may be sufficient to accomplish complete cutting thereof. Nevertheless, according to this invention, it will always be advantageous to accomplish the cutting of the hose in a plurality of passes rather than in a single pass in order to minimize the danger of deleterious effects due to excessive heating of the hose adjacent the cut.

What is claimed is:

1. The method of cutting hose for use in high pressure hydraulic systems to length which hose comprises a rubber wall having a plurality of layers of metal fibers embedded therein and extending longitudinally of said hose, said method comprising the steps of:
   a. positioning a free end of said hose for the cutting of a given length therefrom;
   b. impinging a high power laser beam on a limited area of an exterior surface of said hose at said given length from said free end thereof of sufficient intensity and for a sufficient time to vaporize a portion only of the material of said hose at said limited area without deleterious heating of the material of said hose in immediately adjacent areas thereof in the absence of auxiliary heat sink cooling of said immediately adjacent areas;
   c. moving said impingement of said beam about the periphery of said hose to successively impinge upon contiguous limited areas in a peripheral line corresponding to the desired cut in a plurality of repeated passes until said given length of said hose at said free end thereof is separated from the remainder of said hose by vaporization of material at said line corresponding to the desired cut; and d. simultaneously flooding said limited area of impingement of said beam with an inert gas to prevent combustion of said vaporized material.

2. The method of claim 1 wherein the step of impinging a high power laser beam on a limited area of an exterior surface of said hose comprises impinging a laser beam having a beam power from 5 to 10 kilowatts on a spot having a diameter of about 0.030 inch of said exterior surface of said hose.

3. The method of claim 1 including the additional step of flooding the interior surface of said hose opposite said limited area of impingement of said beam on the exterior surface of said hose with an inert gas.

4. The method of claim 1 wherein said step of moving said impingement of said beam about the periphery of said hose comprises rotating said hose about its axis while holding said beam stationary.

5. The method of claim 1 wherein said step of moving said impingement of said beam about the periphery of said hose comprises holding said hose stationary while deflecting said beam by optical means and rotating said optical means about said hose.

* * * * *